United States Patent [19]
Prill

[11] 4,162,495
[45] Jul. 24, 1979

[54] UPDATING AN EN-ROUTE TACAN NAVIGATION SYSTEM TO A PRECISION LANDING AID

[75] Inventor: Robert S. Prill, Parsippany, N.J.

[73] Assignee: The Singer Company, Little Falls, N.J.

[21] Appl. No.: 819,569

[22] Filed: Jul. 27, 1977

[51] Int. Cl.$^2$ .............................................. G01S 9/14
[52] U.S. Cl. .................................................... 343/7.3
[58] Field of Search ........................................ 343/7.3

[56] References Cited

U.S. PATENT DOCUMENTS

| | | | |
|---|---|---|---|
| 3,900,850 | 8/1975 | Ulman et al. | 343/7.3 |
| 3,936,823 | 2/1976 | Weber | 343/7.3 |
| 3,969,616 | 7/1976 | Mimken | 343/7.3 X |
| 4,010,465 | 3/1977 | Dodington et al. | 343/6.5 LC X |
| 4,040,054 | 8/1977 | Overman | 343/7.3 X |

*Primary Examiner*—Malcolm F. Hubler
*Attorney, Agent, or Firm*—T. W. Kennedy

[57] ABSTRACT

High accuracy distance measurements are achieved with a low accuracy Tacan set by utilizing signals available within the Tacan set at a point of sufficient accuracy to provide accurate distance measurements to be made and thus upgrade an en-route navigation aid to higher accuracy for use in a precision landing system.

14 Claims, 4 Drawing Figures

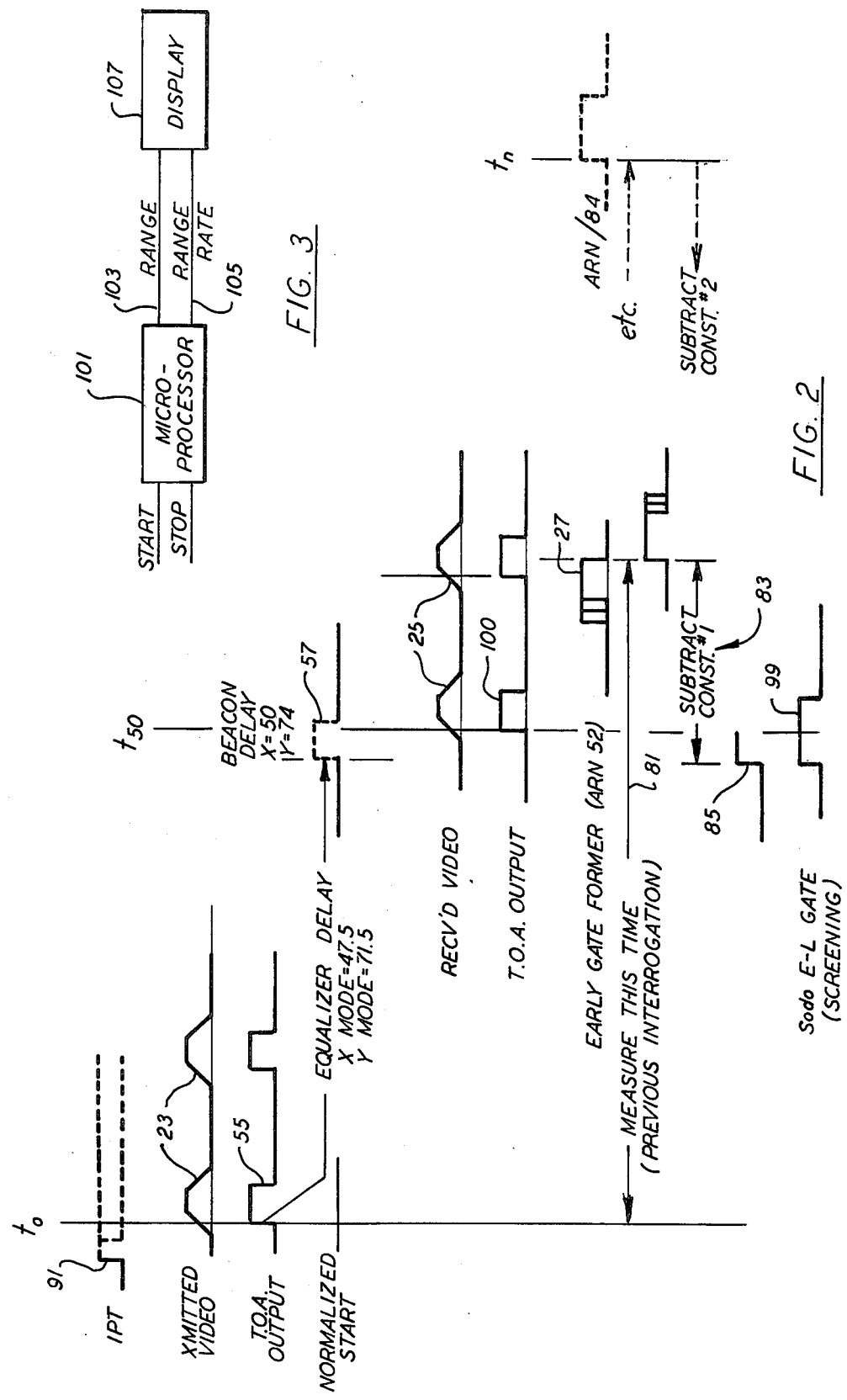

UPDATING AN EN-ROUTE TACAN NAVIGATION SYSTEM TO A PRECISION LANDING AID

BACKGROUND OF THE INVENTION

This invention relates Tacan distance measuring equipment in general and more particularly to apparatus for obtaining and developing signals which permit increased range accuracy in a Tacan system.

Tacan systems are widely used for navigation purposes both in commercial and military aircraft. In general, as is well known in the art, Tacan permits the determination of an aircraft's bearing to a Tacan station transmitter on the ground and also permits a measurement of distance from the aircraft to the Tacan station. The present invention is concerned only with the distance measuring equipment, (DME). In distance measuring, a pulse is transmitted by the aircraft and the ground based Tacan station responds thereto after a predetermined time delay which is known and fixed for each given Tacan system. The Tacan receiver is adapted to isolate the reply out of all the other signals being transmitted by the ground station and once its own reply has been isolated or acquired the range to the ground station can be determined since it will be directly proportional to the time between the request and the return transmission. (Taking into account, of course, the fixed time delay.)

The Tacan system is not a particularly precise instrument and is used primarily to obtain general indications of bearing and distance. Typically, the aircraft flies from one Tacan station to another and an error of even a mile or two is not significant.

In combat with helicopters, particularly in jungle areas, there is desire for the helicopter to fly as closely as possible to the tops of the trees to avoid detection and avoid anti-aircraft fire from the ground. Typically, in such situations, an existing clearing on the ground or one made for that purpose is used as a helicopter landing pad. It is necessary that the helicopter pilot be able to fly to the clearing and simply drop down. Since he is flying at a low altitude, he will not be able to spot the clearing from a distance. Because of this, there is need for a landing system to direct the pilot to the clearing with enough accuracy to then permit him to make a visual landing.

The landing system required could be a new system requiring additional navigation equipment in the aircraft. Such an approach would add weight and cost. Since each aircraft carries a Tacan receiver for other purposes, it is evident that if the Tacan system can be made more accurate it can be used in an effective landing system. It is then only necessary to set up a Tacan transmitter at the location of the landing site and use the conventional Tacan receiver in the aircraft along with a small amount of additional equipment to provide the landing system. Basically, two models of Tacan, one known as the ARN/52 and the other as the ARN/84, are presently in use. The accuracy of the older ARN/52 is relatively poor, the system having an accuracy of plus or minus 600 feet, plus or minus 0.2% of distance within the landing service volume of 0 to 50 miles. A workable landing system requires an accuracy which is an order to magnitude better.

SUMMARY OF THE INVENTION

The object of the present invention is to provide signals from a conventional Tacan set, either the older ARN/52 or the newer ARN/84 type which have sufficient accuracy to permit computing distance from the ground beacon with enough accuracy to permit the Tacan signals to be used as the basic signals in a landing navigation system. A second object is to provide means for processing those signals to provide outputs which can be used by a pilot in guiding his aircraft to a landing site.

In general terms, the present invention fulfills the object of providing accurate signals by utilizing existing signals within the Tacan set at a point of sufficient accuracy modifying those signals in an equalizer so as to be able to provide equally accurate signals whether using the older ARN/52 or newer ARN/84 system.

BRIEF DESCRIPTION OF THE DRAWINGS

FIG. 2 is a waveform diagram helpful in understanding the operation of system of FIG. 1.

FIG. 3 is a block diagram of a microprocessor filter which extracts precision range and range rate from the accurate time measurement between transmission and reply.

DETAILED DESCRIPTION OF THE INVENTION

Prior to describing the present invention, some basic facts concerning the manner in which a Tacan system operates will be given (this explanation relates to the distance measuring or DME equipment of the Tacan). When it is desired to make distance measurements, the Tacan transmitter in the aircraft transmits a pulse, more properly a pair of spaced pulses. The ground station receives these pulses and after a fixed delay transmits return pulses. Mixed in with the return pulses for the transmitting aircraft are other return pulses for other aircraft and additional random pulses transmitted by the Tacan station, these pulses being necessary for the proper operation of the system in determining bearing. The Tacan system in the aircraft contains DME acquisition equipment which singles out the proper return pulse and then looks around that spot for additional pulses, i.e., the rest of the time the DME input signal is blanked. In other words, a gate or window is formed and the tracker looks for pulses only within that window. The Tacan set automatically shifts the window until it reaches a point where it continues to receive return signals in the gated area. When this consistently happens, the tracker realizes that it is looking at the proper return pulses and the time between the transmission of the interrogation and the receipt of the return is then used to compute range. With the fixed delay at the ground station transmitter subtracted out of the time between transmission and receipt, the remaining time interval will be proportional to twice the distance and can be appropriately scaled to feet, miles, etc. Despite the fact that the range computation ultimately obtained from the Tacan is not accurate, the video signal is and the gate signal, particularly that portion of the gate signal which is called the early gate former, i.e., the beginning of the opening of the window, is sufficiently accurate to identify the return pulses of interest.

Figures 1, 1B:
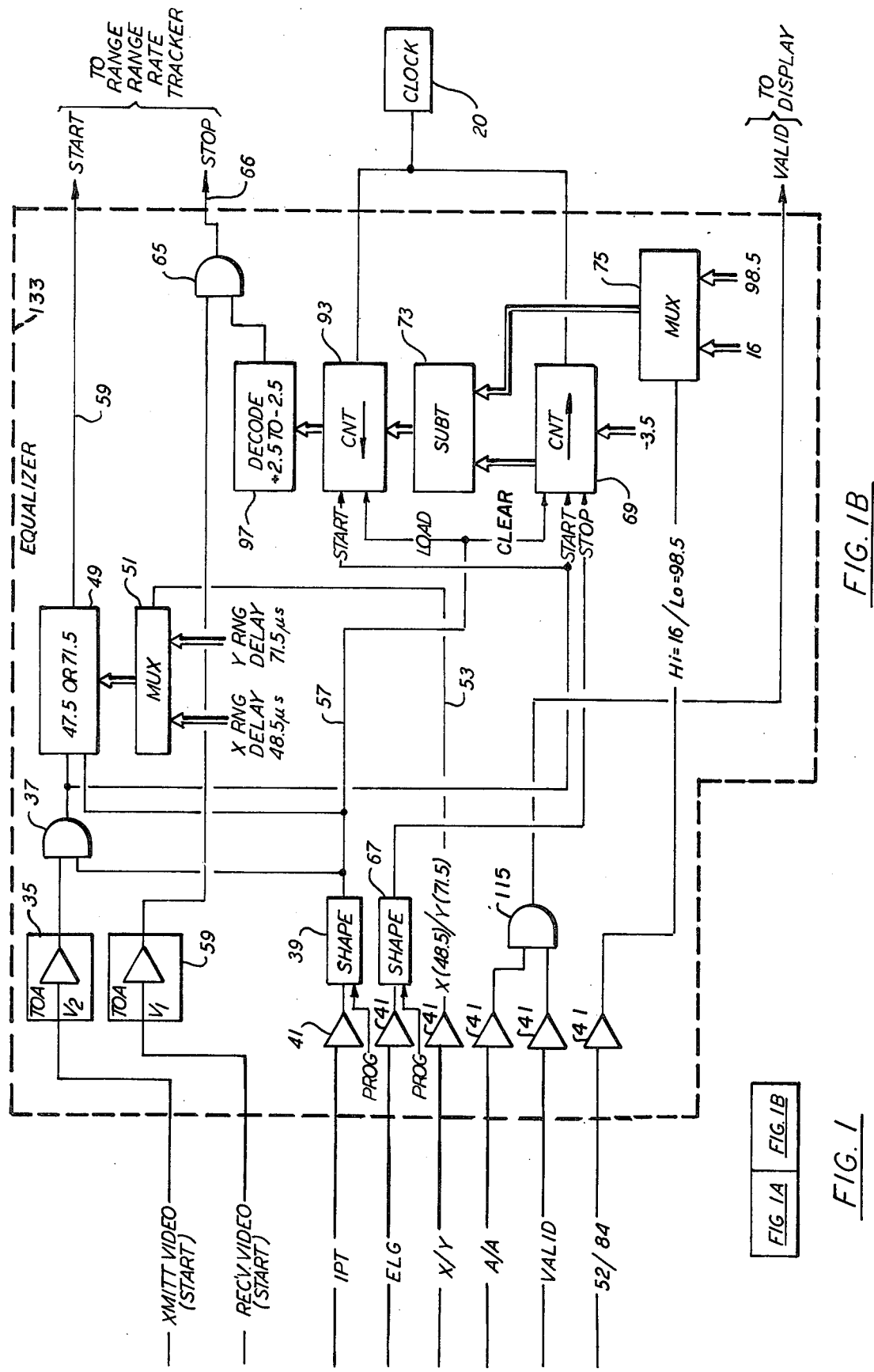
FIGS. 1A and 1B is a block diagram of the system of the present invention for obtaining high distance accuracy from a low accuracy Tacan set.
Figure 1A:
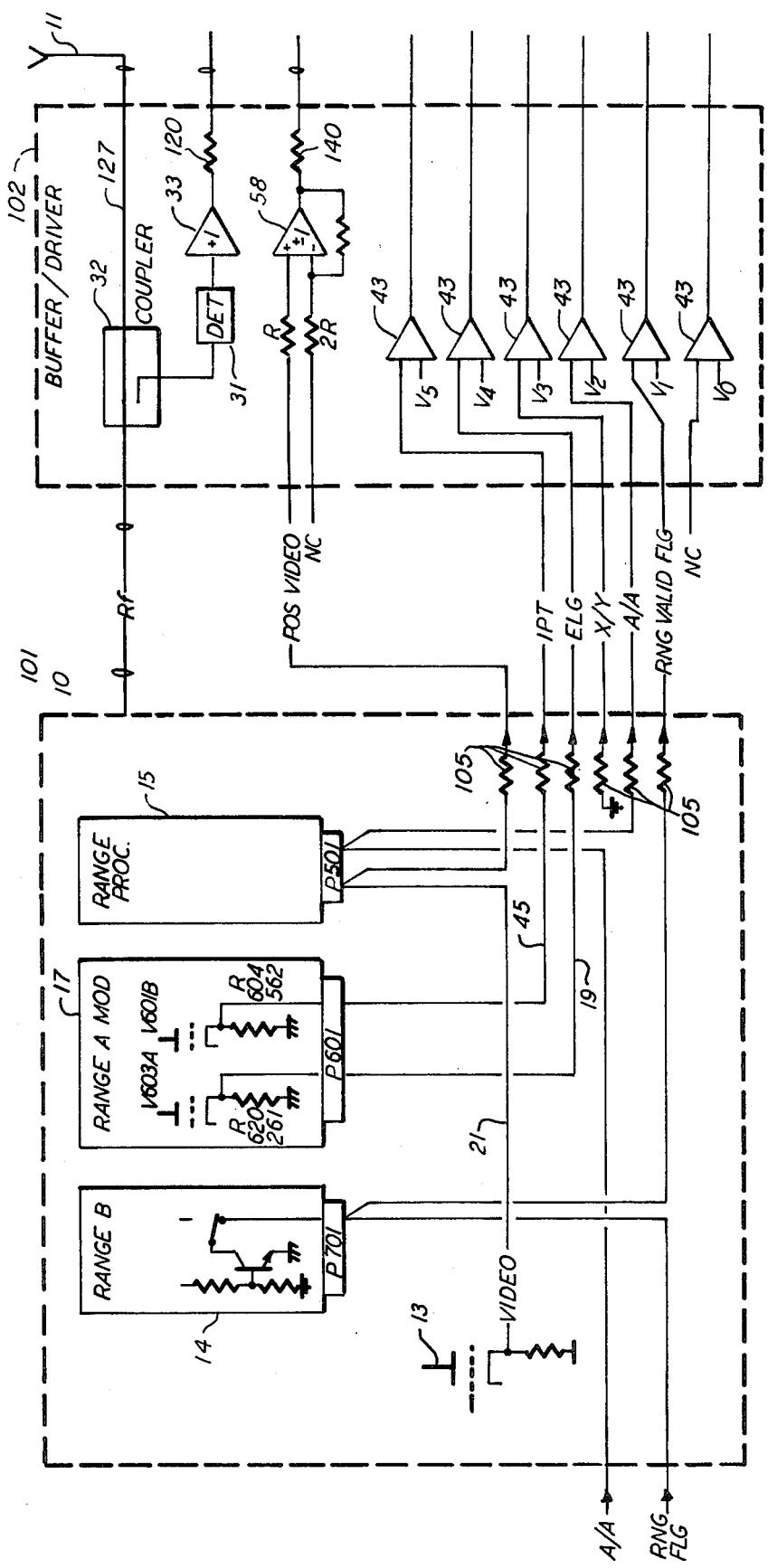

FIGS. 1A and 1B illustrate in block diagram form some of the elements within an ARN/52 Tacan set 101. The signal, after being received through the antenna 11, is processed in conventional fashion and ends up as a video signal out of a video stage tube 13. In the Tacan set, this video signal is provided to a range processing module 15 wherein it is used to determine range. Also shown within the ARN/52 Tacan set 101 is what is referred to as a range A module 17. One of the outputs from this module is a line 19 designated as the early gate former. This signal along with the video signal on line 21 are the two basic signals utilized by the apparatus of the present invention. In addition to recognizing the fact that the early gate former may be used as it appears within the Tacan set, the present invention also recognizes that the video signal out of the video stage 13 is clean enough and is without the errors introduced in further electromechanical processing so that it may be used to obtain signals which permit accurate range determination. A range flag signal is provided as an input to the Tacan set 101, being coupled to the range B module 14. This signal is also coupled through a resistor 105 to the input of a buffer amplifier 43. The output of the buffer amplifier is coupled through a further buffer amplifier 41, the output of which is the input to an AND gate 115. The second input to this gate is a signal A/A from an additional buffer amplifier 41, receiving its input from a further buffer amplifier 43 in the buffer driver module 102, the input amplifier 43 being from the range processing module 15 of the Tacan set 101 through a termination resistor 105. The output of the gate 115, as indicated on the figure, is a "valid" indication to the Tacan display.

FIG. 2 pictorially illustrates the waveforms associated with the Tacan system and the system of the present invention. Shown near the top of FIG. 2 is the transmitted video signal which comprises a pair of pulses 23. These will generally be pulses with a Gaussian shape but, for purposes of simplicity, are shown as truncated triangles. All operations are carried out on the 50% point of the rising edge of the pulses so that a line $t_o$ is shown crossing that point. This signal is received by the ground station or beacon and after a predetermined delay which, as indicated on the figure, is 50 microseconds in an X mode Tacan and 74 microseconds in a Y mode Tacan, the beacon transmitter transmits the reply pulses 25. This is received as the video signal 25. Shown also on FIG. 2 is the early gate former signal 27. As is indicated, it occurs at a time prior to the second pulse of the doublet 25. There is a 12 microsecond difference between the two pulses. Although the Tacan system uses the second pulse of the doublet, the first pulse is actually more accurate and it is desired to make the range measurement according to the present invention based on that pulse.

With these basic considerations in mind, the system illustrated by FIGS. 1A and 1B will now be explained in more detail. As the pulses 23 of FIG. 2 are transmitted through the antenna 11, they are detected in a detector 31 receiving an input from a coupler 32 in the line to antenna 11. The signal provided to the antenna 11 will be, of course, of a large magnitude. The detector and coupler pick off only a small amount of this signal, an amount of magnitude equal to that of the received video signal. This signal from the detector 31 is coupled through a buffer amplifier 33 to a time of arrival or TOA comparator 35 after passing through a resistor 120. The antenna itself is coupled to the Tacan receiver 101 over a line 127 in which the coupler 32 is installed. The coupler 32, detector 31, buffer 33 and resistor 120 are all within a buffer/driver module 102. The majority of the components of the present system are within the equalizer module 133. Comparator 35 has a reference input corresponding to the 50% point and detects the time $t_o$ shown on FIG. 2. The signal from the comparator 35 is coupled through an AND gate 37 which receives its enabling input from a pulse shaper 39 which is coupled through buffer amplifiers 41 and 43 to an interrogate signal on line 45 obtained from the Tacan set. The signal out of AND gate 37 is coupled through a delay means 49 which is controlled by a multiplexer input from a multiplexer 51. The multiplexer has as inputs an X range delay of 48.5 microseconds and a Y range delay of 71.5 microseconds. These are fixed constants in the system. Which of the delays is selected is determined by the signal on line 53 which itself depends on which mode of operation has been selected. On FIG. 2 the TOA output of TOA comparator 35 is shown as the pulse 55, its delay through the delay means 49 is shown with the delayed pulse indicated as 57. This is the pulse which appears on line 59 labeled "Start" and which is provided to a range and range rate tracker. The TOA output pulse 57 or 55 is exactly 2.5 microseconds wide. Thus, when added to the delay of 47.5 or 71.5 microseconds, the trailing edge of the pulse 57 will occur at a time exactly equal to that of the beacon delay of 50 or 74 microseconds. Thus, the trailing edge of the pulse 57 indicates the zero error point of the time measurement which is used in determining the earliness or lateness of the received video leading edge 50% point.

The received video is coupled through the antenna 11 into the Tacan set where it is processed in conventional fashion ending up as the video signal 21 out of the video stage 13. This signal is coupled through an amplifier 58 into a second TOA module comparator 59 the output of which is coupled through an AND gate 65 having as its output line a line 66 labeled "Stop". As with the other signals obtained from the Tacan set, the video signal is coupled through a resistor 105 to the amplifier 58. The output of amplifier 58 is coupled through a resistor 140 to the comparator 59. Of course, many pulses will be received and each of these will appear on the video. All pulses received by the Tacan set will appear there. Thus, the pulses which are in reply to the transmission must be sorted out. This is where the early gate former signal on line 19 comes into play. It is coupled through appropriate buffers into a pulse shaper 67, the output of which is the stop input to a counter 69. The counter 69, coupled to a clock 70, receives a start input from the output of gate 35. It receives a stop output at approximately the peak of the second pulse of a doublet, i.e., at the trailing edge of the early gate former signal. The count in the counter is thus proportional to the distance estimate shown as 81 on FIG. 2. This count is coupled into a subtractor 73 from which a constant of either 16 or 98.5 is subtracted in accordance with whether or not an ARN/52 or ARN/84 is in use. (In the ARN/84 the early gate former occurs even later.) The desired constant is coupled through the multiplexer 75 into the subtractor. This carries out the subtraction indicated as 83 on FIG. 2. The value now present at the output of subtractor 73 corresponds to the time between $t_o$ and the beginning of the pulse 85. This value will be in the subtractor 73 at the end of a cycle. The value so obtained from the previous cycle is used in the next succeeding cycle. The output on line 57 from the shaper 39 which is the IPT or interrogation pretrigger which occurs prior to transmitting a request, is used to load the value of subtractor into a counter 93 and to clear counter 69. Both counter 69 and 93 receive an input from a clock 20. In counter 93 the count is counted down beginning with the occurrence of the pulse out of gate 37. The figure shows a situation where there is actually zero delay, i.e., the transmitter and receiver are right next to each other. In actuality, the pulse 85 would normally occur sometime later than the pulse 57. When the count in the counter gets down to +2.5 an output is provided from a decoder 97 which receives its input from the counter. This output remains until the counter goes through zero and reaches a count of −2.5. Thus, a gate designated as ELG or early/late gate which brackets the point where the 50% point of the received video in the first pulse should occur is obtained. This pulse is shown as pulse 99 on FIG. 2. This pulse provides the enabling input to gate 65. Thus, only a pulse received within the five microsecond gate will pass through the gate 65 and provide the instant accuracy stop output on line 66.

The system thus far illustrated provides outputs on lines 59 and 66. The time between the trailing edge of the pulse on line 59, i.e., pulse 57 of FIG. 2, and the leading edge of the pulse on line 67, i.e., the pulse 100 of FIG. 2, is directly proportional to twice the distance between the Tacan receiver in the aircraft and the ground beacon. These raw signals have sufficient accuracy to permit a determination of range and range rate which permits use in a landing system of the type discussed above.

As illustrated by FIG. 3, the start-stop signals are provided as inputs to a microprocessor 101 in which the range and range rate are computed. The range and range rate are then provided as outputs from the microprocessor on lines 103 and 105 and are coupled into a display 107.

The foregoing description describes a hardware mechanization; in practice once a microprocessor is committed, a major portion of the hardware just described can be eliminated, particularly the counters and subtractor associated hardware.

Also once a microprocessor is committed, it is possible to derive all required signals from only three Tacan signals:
the transmitted RF via a coupler and video detector;
the early gate former signal; and
the received video.

I claim:

1. Apparatus for obtaining from a low accuracy Tacan set accurate range information, the Tacan set including a means to transmit pulses to a ground station, a receiver including a video stage, and a means forming an early gate signal, each transmission of interrogations being carried out in doublets, said early gate former output designed to intercept the receipt of a return of the second pulse of a doublet from a ground station, there being a fixed delay time T between the time when a ground station receives a pulse and transmits a reply comprising:
 (a) means to pick off a portion of the first pulse of each doublet transmitted, said portion having a magnitude approximately equal to the magnitude of the received signal after being processed through the video stage;
 (b) first means to shape said pulse into a square wave pulse the rising edge of said square wave pulse occurring at approximately the 50% point of the rising edge of the transmitted pulse and its falling edge exactly 2.5 microseconds later;
 (c) means to delay said shaped pulse a precise amount of time such that the trailing edge of said pulse will occur at the expected TOA of the rising edge of said transmitted reply pulse;
 (d) second means, coupled to the video stage of the Tacan receiver, to shape pulses obtained therefrom so as to be essentially square wave pulses having rising and falling edges occurring at the 50% points of the video pulses;
 (e) an AND gate having as a first input the output of said second means to shape; and
 (f) means having coupled as inputs the output of said first means to shape the early gate former output of the Tacan receiver and providing a new early late gate output which occurs prior to said early gate former signal by an amount of time sufficient to bracket the first pulse of the doublet coupled as a second input to said AND gate.

2. Apparatus according to claim 1 wherein said Tacan set also includes an IPT output and wherein said means for forming said early late gate signal comprise:
 (a) a clock;
 (b) a first counter coupled to said clock and having a start input and stop input, said start input coupled to the output of said first means to shape and said stop input coupled to said early gate former output;
 (c) a subtractor having as inputs the output of said first counter and a fixed value equal to the time between pulses in a doublet;
 (d) a second counter having preset inputs coupled to the output of said subtractor, said second counter having a load input coupled to the IPT output of the Tacan receiver, said IPT output also being a clear input to said first counter, and having a start input enabling it to count down from its present value said start input coupled to the output of said first means to shape; and
 (e) a decoder coupled to the output of said counter and arranged to provide an output pulse over a count corresponding to plus 2.5 microseconds to −2.5 microseconds, the output of said decoder being the second input to said AND gate.

3. Apparatus according to claim 2 wherein said apparatus is adapted to operate both on an X range delay and Y range delay and further including a multiplexer providing an input to said delay means, said multiplexer having as fixed inputs an X range delay of 48.5 microseconds and a Y range delay of 71.5 microseconds, said multiplexer having as a control input an output of the Tacan set indicating whether it is in an X or a Y mode.

4. Apparatus according to claim 2 wherein said apparatus is adapted to operate with either an ARN/52 or ARN/84 Tacan set and further including a second multiplexer having as data inputs fixed time values of 16 and 98.5 microseconds corresponding to the amount of time that the start of a synthetic early-late gate window must begin from the start of the next interrogation for the ARN/52 and ARN/84 Tacan sets respectively; and having a control input for selectively providing either of said inputs as an output, said output being coupled as the fixed input to said subtractor.

5. Apparatus according to claim 1 wherein said first and second means to shape comprise comparators having as one input the respective transmitter signal and received video signal and as a second input a value corresponding to the voltage at the 50% level of said pulses.

6. Apparatus according to claim 7 and further including a second AND gate between said first means to shape and said delay means having an enabling input coupled to said IPT output of said Tacan receiver.

7. Apparatus according to claim 6 and further including a pulse shaper between said IPT output and said AND gate.

8. Apparatus according to claim 7 wherein the output of said pulse shaper further acts to clear said delay means.

9. Apparatus according to claim 2 and further including a pulse shaper interposed between said early gate former output and said first counter.

10. Apparatus according to claim 1 wherein said means for sampling a portion of said transmitted signal comprise a coupler coupled to the antenna feed for the transmitting antenna of the Tacan set; and a detector having the output of said coupler as an input.

11. A method of obtaining accurate signals from a low accuracy Tacan set comprising:
   (a) sampling the first pulse of each doublet transmitted by the Tacan set;
   (b) delaying said doublet by an amount proportional to the fixed ground station delay to develop a start signal;
   (c) picking off from the Tacan receiver the video signal therein; and
   (d) selecting as a stop signal the first video pulse of each doublet received which is identified by the Tacan set as a proper response.

12. The method of claim 11 and further including the step of shaping both said transmitted pulse and said received video pulse so as to form square waves having rising and falling edges occurring at the 50% points of the transmitted and received pulses.

13. The method according to claim 12 wherein said step of delaying comprises delaying by an amount equal to the fixed ground station delay time minus the width of a transmitted and received pulse between the 50% points whereby the falling edge of the delayed pulse represents the start signal.

14. The method according claim 13 wherein said step of selecting said first pulse of a received doublet video signal comprises:
   (a) measuring the time between the occurrence of a delayed transmitted pulse and the occurrence of the early gate former in the Tacan set;
   (b) subtracting from said time a fixed amount of time equal to the time between pulses in a doublet to obtain a result;
   (c) generating an early-late gate signal after the next transmitted first pulse of a doublet which is present over a time period extending plus and minus a predetermined number of microseconds from said result; and
   (d) selecting as the first pulse of a doublet to be used as a stop signal the pulse occurring during the time when said early-late gate former signal is present whereby the time between said start and said stop signals will be proportional to twice the distance between the Tacan set and the ground station.

* * * * *